United States Patent [19]

Ansell et al.

[11] 4,007,296
[45] Feb. 8, 1977

[54] METHOD FOR MAKING THICK FILM CAPACITORS

[75] Inventors: Joseph L. Ansell, Rockville; Phillip G. Brusius, Wheaton; Raymond J. Baker, Silver Spring, all of Md.

[73] Assignee: The United States of America as represented by the Secretary of the Army, Washington, D.C.

[22] Filed: June 29, 1974

[21] Appl. No.: 484,019

[52] U.S. Cl. .............................. 427/79; 29/25.42; 317/249 D; 317/253; 427/282

[51] Int. Cl.² .......................................... H01G 4/06

[58] Field of Search .......... 29/25.42; 317/242, 261, 317/253, 249 D; 117/212, 38; 427/79, 81, 282

[56] References Cited

UNITED STATES PATENTS

| | | | |
|---|---|---|---|
| 2,336,091 | 12/1943 | Gray | 317/261 |
| 2,367,681 | 1/1945 | Karplus et al. | 317/253 X |
| 2,437,212 | 3/1948 | Schottland | 29/25.42 |
| 2,608,601 | 8/1952 | Boardman | 317/261 |
| 3,398,338 | 8/1968 | Dornfeld | 317/261 |
| 3,604,082 | 9/1971 | McBrayer et al. | 29/25.42 |
| 3,821,617 | 6/1974 | Shelby | 29/25.42 |

*Primary Examiner*—Carl E. Hall
*Attorney, Agent, or Firm*—Nathan Edelberg; Robert P. Gibson; Saul Elbaum

[57] ABSTRACT

A method for making precision thick film capacitors is described. A conductive pattern is printed on both sides of a substrate such that the two patterns at least partially overlap. A capacitor of predetermined value is obtained by calculating and providing the area of overlap necessary for such value of capacitance.

1 Claim, 3 Drawing Figures

METHOD FOR MAKING THICK FILM CAPACITORS

RIGHTS OF THE GOVERNMENT

The invention described herein may be manufactured, used, and licensed by or for the United States Government for governmental purposes without the payment to the inventors of any royalty thereon.

BACKGROUND OF THE INVENTION

This invention relates to printed circuitry techniques and, more particularly, this invention relates to the method for making precision thick film capacitors having predetermined values.

A common method for fabricating a precision thick film ceramic capacitor requires: Printing in registry an upper and lower plate on a ceramic substrate; measuring the value of the capacitance with respect to said plates; abrasively cutting away or using a laser burning away the portion of one plate of the capacitor and thereby decreasing the capacitance value to the value desired.

The prior art method of trimming down the capacitance value of a thick film capacitor to a precision value by cutting away a portion of one plate of the capacitor has certain disadvantages. First, the capacitance value may only be adjusted downward. As a consequence, should the capacitance value be trimmed beyond the point desired, readjustment is impossible. Secondly, trimming by this method leaves an unprotected edge of the capacitor plate which decreases its reliability due to susceptibility to attack by moisture, dirt, or chemicals.

Accordingly, it is a primary object of this invention to provide a precision thick film capacitor having a predetermined value.

Another object of the present invention is the elimination of the requirement of a cutting away of a portion of a plate of a ceramic thick film capacitor in order to achieve a precise value thereof.

Still another object is a method of producing thick film parallel plate capacitors in incremental values with the same plate pattern and area.

These and other objects are accomplished in accordance with the teaching of the present invention.

SUMMARY OF THE INVENTION

Briefly, in accordance with this invention, a thick film capacitor having a predetermined value is made by printing a conductive pattern on one side of a substrate and then printing in a somewhat displaced position the same pattern on the opposite side of the substrate. The area of overlap of the two patterns is arranged to be proportional to the desired value of capacitance.

BRIEF DESCRIPTION OF THE DRAWINGS

The foregoing and other objects, features, and advantages of the present invention will be apparent from the following particular description of the preferred embodiment of the invention as illustrated in the accompanying drawings, wherein.

DESCRIPTION OF THE PREFERRED EMBODIMENT

Figure 1:
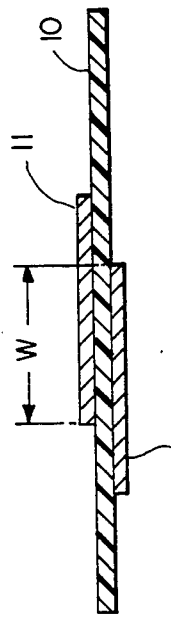
FIG. 1 is a cross-sectional view of thick film capacitor made in accordance with this invention.

Referring now to FIG. 1, a cross-sectional view is indicated of a substrate 10. Printed on the upper half of the substrate is a layer of conductive metal film 11 and on the lower half a conductive metal film 12. The upper and lower conductive films overlap over a portion "W" of each layer. This overlap region constitutes the effective capacitor.

Figure 2:
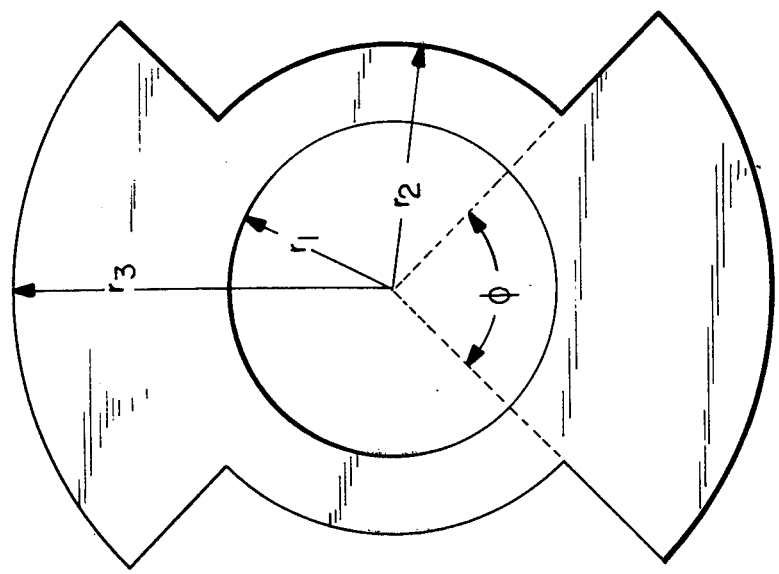
FIG. 2 is an illustration of a desired pattern for forming the precision thick film capacitor of the invention.

A wide variety of plate designs can be utilized in accordance with this invention, one example of which is illustrated in FIG. 2. This pattern may be generalized by assuming that $r_1 < r_2 < r_3$ and $\phi < 180°$. Accordingly, the coordinate system selected for use with this pattern is a plane cylindrical coordinate system where the variable are $r$ and $\phi$. The center of the coordinate system is at the symmetrical center of the pattern.

Given the pattern shown in FIG. 2, the area can be calculated for the maximum and minimum conditions as follows:

$$A_{max} = \pi r_2^2 - \pi r_1^2 + \frac{2\phi}{360}(\pi r_3^2 - \pi r_2^2)$$

$$A_{max} = \pi \left[ r_2^2 \left(1 - \frac{\phi}{180}\right) + \frac{\phi}{180} r_3^2 - r_1^2 \right]$$

When the patterns on top and bottom are aligned, this is the area of the parallel plate capacitor.

When the two patterns are printed with a 90° rotation to each other, minimum area is obtained and this is equal to

| $A_{min}$ | = | $\pi r_2^2 - \pi r_1^2$ |
| | = | $\pi(r_2^2 - r_1^2)$ |

Now to obtain area of overlap as a function of pattern rotation, the angle of rotation will be defined as where $0 < \psi < 90°$. The area of overlap of the two patterns can be written as $$A_{overlap} = A_{min} + \frac{(\phi - \psi)(A_{max} - A_{min})}{\phi}$$

$$= \pi(r_2^2 - r_1^2) + \left(\frac{\phi - \psi}{\phi}\right)\left(\frac{\phi \pi}{180}\right)(r_3^2 - r_2^2)$$

$$\pi \left[ (r_2^2 - r_1^2) + \left(\frac{\phi - \psi}{180}\right)(r_2^2 - r_2^2) \right]$$

For $0 < \psi < \phi$
$A_{overlap} = A_{min} = \pi(r_2^2 - r_1^2)$

For $\phi < \psi$
Now one can obtain the capacitance as a function of $\psi$. The formula for a parallel plate capacitor (neglecting fringing capacitance) is $$C_{(pf)} = 0.224 \frac{\mu_r A}{d}$$

where:
$\mu_r$ = Dielectric constant
$A$ = Area (in$^2$)
$d$ = Separation (in).

Assuming that A is a 0.025 inch thick Alumina substrate for the thick film circuit, it follows that $$C = \frac{0.224 \ (9.3) \ A}{.025} = 83.328 \ A$$

Substituting A overlap for A in the above equation:

$$C = 83.328 \ \pi \left[ (r_2^2 - r_1^2) + \frac{(\phi - \psi)(r_3^2 - r_2^2)}{180} \right]$$

For $0 < \psi < \phi$

This is an expression from which one can obtain a capacitance, given a rotation or vice versa. Similar derivations can be performed for other patterns. This pattern gives a maximum capacitance, a minimum capacitance and a linear variation between them as a function of angle of rotation. If some other type of function (logarithmic, sinusoidal, etc.) were desired, a different pattern would be required, but the process would be the same.

Figure 3:
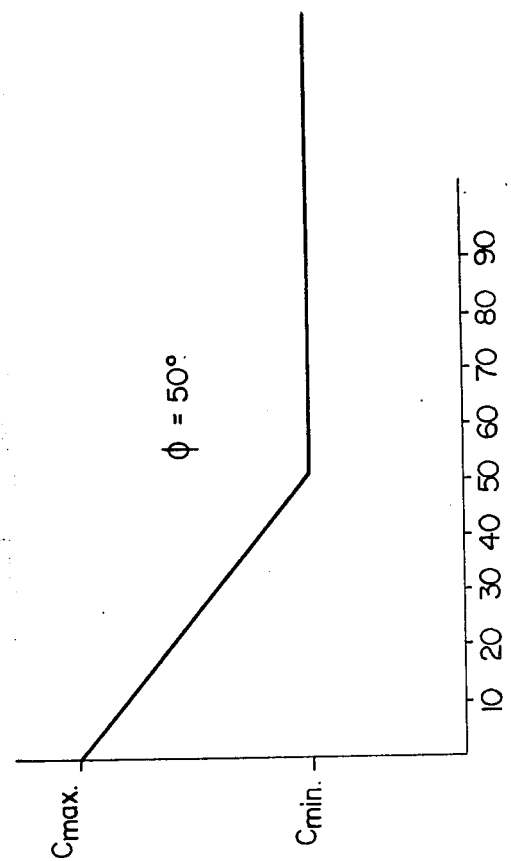
FIG. 3 is a graph for determining the capacitance at a particular value of the rotation parameter with respect to the pattern shown in FIG. 2.

A graph can be constructed from the equation or from a direct measurement of the overlapping area for various positions of the overlap. This can be done by graphical measurement of the overlap area as well as use of equations. Accordingly, FIG. 3 is a graph of capacitance versus pattern rotation for the pattern of FIG. 2. The maximum and minimum capacitance are indicated on the graph of FIG. 3 and the capacitance may be determined from the graph for any position measured in terms of the coordinate parameter.

Similar derivations may be performed for other patterns. This pattern gives a maximum capacitance, a minimum capacitance, and a linear variation as indicated in FIG. 3 between $C_{max}$ and $C_{min}$ as a function of angle of rotation. Other coordinate parameters such as translation may also be used.

It is to be noted that sometimes it is desired that the variation in capacitance from the maximum to the minimum value be non-linear, i.e., logarithmic or sinusoidal. In this situation a different pattern may be required but it may be easily calculated from simple principles of plane geometry and trigonometry.

The first step in the fabrication process is the selection of the maximum and minimum values of capacitance between which lies the desired value of capacitance. A pattern is then selected for the plates of the capacitor as well as the location of the center of the coordinate system with respect to the plate pattern. The screen patterns of the plates of the capacitor are then made and oriented with respect to one another at the value of the coordinate parameter which corresponds most closely to the desired value of capacitance from the equation or graph previously determined. The capacitor plates are printed onto a substrate such as alumina or steatite or beryllia and sintered. After firing, the capacitor value is measured to determine whether or not the actual capacitance value is equal to the desired value. The process may have to be repeated in order to achieve a desired degree of accuracy.

While the invention has been particularly shown and described with reference to a preferred embodiment thereof, it will be understood by those skilled in the art that the foregoing and other various changes in form and details may be made therein without the departing from the spirit and scope of the claimed invention.

We claim:
1. A method of making a capacitor of a desired capacitance comprising the steps of
   selecting an electrode pattern for said capacitor having a center point, wherein said electrode pattern is an annulus having inside and outside radii which annulus is extended in diametrically opposed directions by two diametrically opposed portions of a circle, each of said portions being defined by an inside arc having the same radius as said outside radius of said annulus and an outside arc having a greater radius, and each of said portions subtending an arc of less than 180°, and which when printed on opposite faces of a substrate, with respective center points aligned, and when the patterns are rotated such that the printed electrode pattern on each face is rotated relative to the electrode on the opposite face, the electrodes provide an area of electrode overlap which varies according to a linear function of the relative rotation between the two patterns,
   determining the specific amount of said relative rotation which results in the overlap corresponding to said desired capacitance,
   conductively printing a first one of said patterns on one face of a substrate,
   conductively printing a second one of said patterns on the opposite face of said substrate with the center point of said second pattern aligned with the center point of said first pattern, but with said second pattern relatively rotated by said specific amount with respect to said first pattern.

* * * * *